United States Patent
Verdier

[15] 3,645,314
[45] Feb. 29, 1972

[54] WIDE TREAD TIRE FOR HEAVY-DUTY VEHICLES

[72] Inventor: Henri Verdier, Beauregard-L'Eveque, France

[73] Assignee: Compagnie Generale Des Etablissements Michelin, raison sociale Michelin & Cie, Clermont-Ferrand (Puy-de-Dome), France

[22] Filed: Jan. 30, 1970

[21] Appl. No.: 7,010

[30] Foreign Application Priority Data

Jan. 30, 1969 France..................................6901996

[52] U.S. Cl............................................................152/209
[51] Int. Cl.......................................................B60c 11/04
[58] Field of Search...............................152/210, 209, 209 D

[56] References Cited

UNITED STATES PATENTS

3,376,912 4/1968 Tiborcz..................................152/209
De.182,340 3/1958 Palko..................................152/209 D

*Primary Examiner*—James B. Marbert
*Attorney*—Brumbaugh, Graves, Donohue & Raymond

[57] ABSTRACT

The median zone of the tread of a tire includes elements in relief directed longitudinally. Lateral zones on either side of the median zone include elements in relief directed transversely. Successive ones of the transverse elements in each of the lateral zones have inner ends alternately closer to and farther from the median plane. Different portions of the longitudinal elements are at different distances from the median plane. The longitudinal and transverse elements overlap at least partially.

8 Claims, 3 Drawing Figures

PATENTED FEB 29 1972 3,645,314

INVENTOR
HENRI VERDIER
BY
Trumbaugh, Graves, Donohue & Raymond
his ATTORNEYS.

WIDE TREAD TIRE FOR HEAVY-DUTY VEHICLES

BACKGROUND OF THE INVENTION

This invention relates to tires and, more particularly, to tires having a novel and highly effective arrangement and shape of the elements in relief on the tread. The invention relates to both new and recapped tires, especially of the radial carcass type, with a wide tread, and intended to be mounted on industrial or heavy-duty vehicles.

Tires designed for use on loose ground and tires designed for use on normal roads must satisfy opposing requirements. In order to obtain a good grip while rolling over loose ground, it is advisable to use treads composed of massive relief elements that are widely spaced apart. Such a construction is not suitable for road travel inasmuch as the lack of rigidity of a tread articulated by elements that are widely spaced leads to excessive heating and rapid wear and tear. It is preferable to use for vehicles traveling on highways a tread consisting of relief elements that are mainly circumferential ridges supporting each other mutually thanks to their small separation and consequently offering maximum rigidity.

Attempts have previously been made to design tires having treads suitable for mixed use: i.e., suitable for travel without distinction over both highways and loose ground. These prior treads comprise in their center portion one or more continuous or discontinuous circumferential ridges and in their lateral portions transverse or oblique elements that are spaced apart to varying extents. However, these prior structures have been unsatisfactory. Depending on whether the transverse elements are or are not massive or widely spaced apart and form an aggregate which is more or less gripping, one again encounters the advantages and disadvantages of tires designed to travel either on loose ground or on highways.

SUMMARY OF THE INVENTION

An object of the present invention is to remedy the deficiencies of prior tires noted above. More particularly, an object of the invention is to provide a tire having a tread that possesses at the same time good grip on loose ground and good highway properties: that is, to provide a tire capable of normal service, regardless of whether on a highway or on loose ground, as in the case of trucks used to haul dirt dug up in earthwork excavations. The trucks must not get stuck in the dirt and mud at the site of the excavation and must also travel long distances on highways, carrying a heavy load, without excessive wear and tear and heating of the tires.

The foregoing and other objects of the invention are attained, in a representative embodiment thereof, by the provision of a tire the tread of which comprises, in a median zone, relief elements running in the longitudinal direction and, in two lateral zones on either side of the median zone, relief elements running in the transverse direction. The tread is characterized in that the transverse elements in each lateral zone have their inner ends alternately nearer to and farther from the median plane of the tire, and in that different portions along the length of the longitudinal elements are at different distances from the median plane of the tire and at substantially uniform distances from the transverse elements, so as to achieve at least a partial overlap of the transverse and longitudinal elements.

By inserting between transverse elements a longitudinal element or part of it, one improves the cohesion among the different elements of the tread and it then becomes possible to space the elements in such a manner as to give the tread a better gripping characteristic without thereby excessively increasing its mobility. Thus, one may provide between the elements in relief a space the width of which is within the range of one-third to one-half of the width (i.e., the smaller dimension) of the elements in relief.

Preferably, the tire includes the following additional measures.

As regards the longitudinal elements, it is desirable to use two rows of elements the portions of which close to the median plane are arranged on either side of said plane and overlap or are imbricated the ones with respect to the others, and the portions of which farther from the median plane have a maximum distance from such plane which at least equals the minimum distance separating such plane from the transverse elements. The intervals between the longitudinal elements in the direction of the circumference are placed in the prolongation of the transverse elements on either side of the tread.

The transverse elements preferably are formed with a transverse inner portion and an oblique outer portion. The oblique outer portions may be parallel on opposite sides of the tread or symmetrical with respect to the median plane, depending on whether a nondirectional or a directional tire is desired: i.e., a tire having the same properties or different properties in the two directions of rotation. It is advantageous if the outer oblique portions are short and long alternately and also the inner transverse portions, with a long, outer portion corresponding to a short, inner portion, and vice versa. In another embodiment, one may use in the lateral zones either entirely crosswise or entirely oblique elements with the same inclination over their entire length. All these provisions make it possible to improve the traction on loose soil.

The transverse and longitudinal elements advantageously have substantially equal surface areas, the transverse dimensions of the former being approximately equal to the longitudinal dimensions of the latter and vice versa.

As regards the intervals separating the various elements in relief, their width may be, as indicated above, one-third or one-half of the width (small dimension) of the elements in relief. It is of advantage if the depth of the transverse grooves increases from the center towards both edges of the tread.

Finally, in accordance with a special feature of the invention, the type of molding described in especially suitable for "double" tire covers: i.e., tire covers with great width in relation to their height on the rim, intended to support a very heavy load.

BRIEF DESCRIPTION OF THE DRAWING

An understanding of additional aspects of the invention may be gained from a consideration of the following detailed description of the preferred embodiments thereof, in conjunction with the appended figures of the drawing, wherein.

DESCRIPTION OF THE PREFERRED EMBODIMENTS

Figure 1:
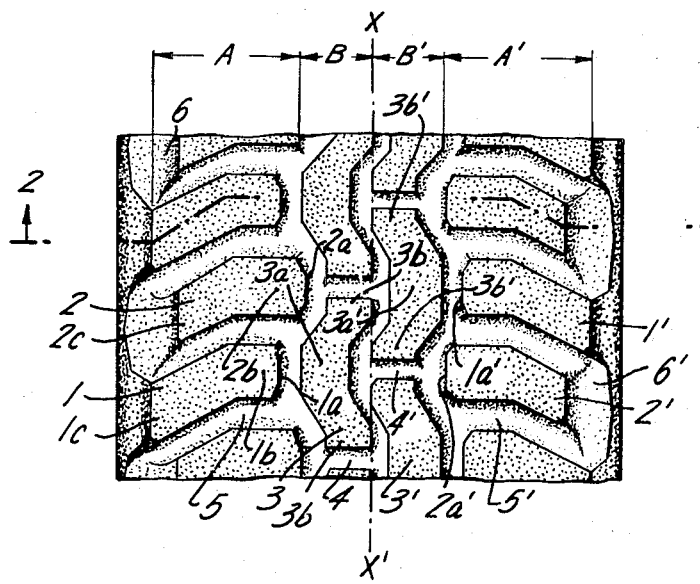
FIG. 1 is a developed plan view of a portion of a tread of a tire in accordance with the invention between two radial planes of the tire angularly spaced apart about the tire axis by 30°.

FIG. 1 shows a tread comprising two rows A and A' of transverse elements in relief marked 1, 1', 2 and 2', and two rows B and B' of longitudinal elements in relief marked 3 and 3'. The various elements all have substantially the same surface area and the transverse dimension (length) of the elements 1, 1' and 2, 2' corresponds approximately to the longitudinal dimension (length) of the elements 3, 3'. Likewise, the longitudinal dimension (width) of the elements 1, 1' and 2, 2' corresponds approximately to the transverse dimension (width) of the elements 3, 3'.

The inner ends 1a and 1a' of the transverse elements 1 and 1' are at a greater distance from the median plane X—X' than are the inner ends 2a and 2a' of the transverse elements 2 and 2'. Furthermore, the longitudinal elements 3 and 3' comprise center portions 3a and 3a' at the same longitudinal position as the transverse 3 elements 1 and 1', respectively, and terminal portions 3b and 3b' at the same longitudinal position as the transverse elements 2 and 2'. The portions 3a and 3a' are farther from the median plane X—X' than are the portions 3b and 3b'.

The portions 3a and 3a' of the longitudinal elements 3 and 3' extend away from the median plane X—X' in the transverse direction at least as far as the inner ends 2a and 2a' of the transverse elements 2 and 2'. As a result, there is an overlapping of the transverse and longitudinal elements. The overlap is longitudinal in that there are longitudinal lines that intersect both longitudinal and transverse elements. The overlap makes it possible to impart to the transverse grooves 5 separating the elements 1 and 2 a width substantially equaling 40 percent of the width of the elements 1 and 2. Likewise, the transverse grooves 5' separating the elements 1' and 2' have a width substantially equaling 40 percent of the width of the elements 1' and 2'.

The portions 3a, 3b and 3a', 3b' of the elements 3 and 3' placed at different distances from the median plane X—X' facilitate not only the overlapping of the elements 3 with the elements 1 and 2 and the elements 3' with the elements 1' and 2' but also the shouldering with respect to one another of the elements 3 and 3'. Towards such end, the elements 3 and 3' are arranged symmetrically in relation to the median plane X—X' (concave towards the median plane in the illustrated embodiment) but staggered or set off with respect to one another by one-half length. The elements 3 and 3' overlap longitudinally in that there are longitudinal lines that intersect both elements 3 and elements 3'.

The transverse grooves 4 and 4' separating the successive elements 3 and 3' are at the same longitudinal position as the elements 2 and 2', respectively. This provides improved traction on loose ground without permitting excessive mobility of the elements 3 and 3' on hard ground.

The transverse elements 1 and 2 respectively comprise an inner transverse portion 1b, 2b. The portion 2b is longer in the transverse direction than the portion 1b. The transverse elements 1 and 2 also respectively comprise an outer oblique portion 1c, 2c inclined by approximately 60° to 70° with respect to the median plane X—X. The portion 1c is longer in the transverse direction than the portion 2c. The elements 1', 2' are similarly formed, as the figure shows. This produces cavities 6 and 6' facilitating the ejection of the earth which may be retained between the lateral elements 1, 2 and 1', 2'.

In FIG. 1, the elements 1 and 2 as well as 1' and 2' have oblique outer portions which are symmetrical in relation to the median plane X—X'. The tire thus has directional properties: i.e., properties that are a function of the direction of rotation of the tire.

Figure 3:
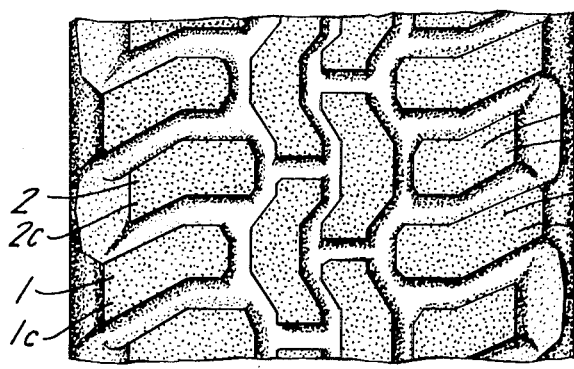
FIG. 3 is a developed plan view of a portion of a tread of another tire in accordance with the invention.

In contrast, in FIG. 3, the oblique portions 1c, 2c and 1c', 2c' of the elements 1, 2 and 1', 2' are all substantially parallel. Thus, the properties of the tire are the same in both directions of rotation.

Figure 2:
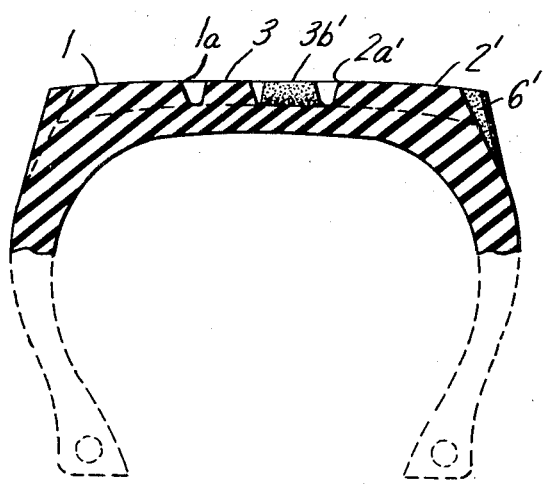
FIG. 2 is a cross-sectional view taken along the lines 2—2 in FIG. 1 and looking in the direction of the arrows.

FIG. 2 is a cross section of the tire the tread of which is shown in FIG. 1. The depth of the transverse grooves increases from the center towards the edge. The increase in groove depth at the edge does not exceed 50 percent of groove depth at the center. Furthermore, the cross section of the tire is especially wide and constitutes a double cover carrying the same load as conventional twin tires mounted on the rear axles of trucks or other heavy vehicles.

Thus, there is provided in accordance with the invention a tire having elements in relief that are comparatively aggressive even though less so than in the case of a tire designed solely for travelling off highways. That is, the elements in relief are definitely separated from one another. However, the tire has good road behavior properties and can withstand rapid and long travel on highways, thanks to the cohesion obtained by the arrangement with relation to one another of the various kinds of elements which support one another mutually. The tread does not comprise any marked preferential deformation zone capable of resulting in accelerated localized wear and tear.

Many modifications of the preferred embodiments described herein will readily occur to those skilled in the art, and the invention is to be construed as including all the embodiments thereof within the scope of the appended claims.

I claim:

1. A tire comprising a tread having, in a median zone, longitudinal elements in relief with a large dimension directed longitudinally and a small dimension directed transversely and, in two lateral zones on either side of said median zone, transverse elements in relief with a large dimension directed transversely and a small dimension directed longitudinally, successive ones of said transverse elements in each of said zones having inner ends alternately closer to and farther from the median plane, thereby to define longitudinally spaced apart setback zones located laterally inwardly of each of said transverse elements of which the inner ends are farther from the median plane and longitudinally spaced apart inset zones located laterally inwardly of each of said transverse elements of which the inner ends are closer to the median plane, and each of said longitudinal elements comprising a center portion and end portions at either end of the center portion, the center portion of each longitudinal element being located at a greater distance from the median plane than either of the end portions and occupying one of said setback zones and each end portion of each longitudinal element occupying a portion of a setback zone so that there is an at least partial longitudinal overlap of the transverse with the longitudinal elements.

2. A tire according to claim 1 wherein said elements in relief are separated by grooves the width of which is within the range of one-third to one-half of the small dimension of the elements in relief and the depth of which increases from the center towards each edge of the tread.

3. A tire according to claim 1 wherein said longitudinal elements are disposed in two rows close to and on either side of the median plane, each element of one row overlapping portions of two adjacent elements of the other row in the longitudinal direction.

4. A tire according to claim 1 wherein said transverse elements comprise an inner transverse portion and an outer oblique portion, the inner transverse portion being alternately longer and shorter than the outer oblique portion in the case of successive ones of the transverse elements in each of the lateral zones.

5. A tire according to claim 4 wherein the oblique portions of the transverse elements are oriented symmetrically on either side of the tread so as to render the tire directional.

6. A tire according to claim 4 wherein the oblique portions of the transverse elements are parallel with one another on either side of the tread.

7. A tire according to claim 1 wherein all of said elements in relief have substantially the same surface area.

8. A tire according to claim 3 wherein said tire is of the double cover type.

* * * * *